(12) United States Patent
Shimizu et al.

(10) Patent No.: US 8,287,981 B2
(45) Date of Patent: Oct. 16, 2012

(54) METAL DIAPHRAGM

(75) Inventors: Toshiharu Shimizu, Asago (JP); Shigehisa Kinugawa, Asago (JP); Shinichi Sugahara, Asago (JP)

(73) Assignee: Tacmina Corporation, Osaka (JP)

( * ) Notice: Subject to any disclaimer, the term of this patent is extended or adjusted under 35 U.S.C. 154(b) by 166 days.

(21) Appl. No.: 12/922,256

(22) PCT Filed: Mar. 13, 2009

(86) PCT No.: PCT/JP2009/054890
§ 371 (c)(1),
(2), (4) Date: Sep. 13, 2010

(87) PCT Pub. No.: WO2009/113666
PCT Pub. Date: Sep. 17, 2009

(65) Prior Publication Data
US 2011/0020588 A1    Jan. 27, 2011

(30) Foreign Application Priority Data
Mar. 14, 2008   (JP) .................................. 2008-065093

(51) Int. Cl.
*F04B 43/02* (2006.01)
(52) U.S. Cl. ............................ 428/80; 428/51; 428/64.1
(58) Field of Classification Search ............... 428/80, 428/51, 64.1
See application file for complete search history.

(56) References Cited

U.S. PATENT DOCUMENTS

| | | | | |
|---|---|---|---|---|
| 5,881,997 A | * | 3/1999 | Ogawa et al. | ............... 251/335.2 |
| 5,899,813 A | | 5/1999 | Bunce | |
| 6,655,216 B1 | * | 12/2003 | Aizawa | ........................... 73/715 |

FOREIGN PATENT DOCUMENTS

| | | |
|---|---|---|
| JP | 60-8492 U | 1/1985 |
| JP | 01-203672 A | 8/1989 |
| JP | 01-237370 A | 9/1989 |
| JP | 04-054378 A | 2/1992 |
| JP | 05-133471 A | 5/1993 |
| JP | 6-80958 U | 11/1994 |
| JP | 11-34870 A | 2/1999 |
| JP | 2000-514160 A | 10/2000 |
| JP | 2002-022011 A | 1/2002 |
| JP | 2005-265784 A | 9/2005 |
| JP | 2006-219996 A | 8/2006 |
| JP | 2007-239769 A | 9/2007 |

* cited by examiner

*Primary Examiner* — Brent O'Hern
(74) *Attorney, Agent, or Firm* — The Webb Law Firm

(57) ABSTRACT

Provided is a diaphragm that can be securely and firmly fixed to a predetermined fixing position without deteriorating the function of a film part. The diaphragm is provided with a film part (1a) that is elastically deformable by a predetermined pressure, a thick part (1b) that is disposed at a rim portion of the film part (1a) and has a thickness greater than the film part (1a), and a protection part (1d) that is disposed between the film part (1a) and the thick part (1b) in contact with the film part (1a) and is elastically deformable along with elastic deformation of the film part (1a) to protect the film part (1a).

5 Claims, 7 Drawing Sheets

METAL DIAPHRAGM

TECHNICAL FIELD

The present invention relates to a metal diaphragm that is deformable by, for example, a predetermined pressure.

BACKGROUND ART

For example, a metal diaphragm having a thin film shape is used in a broad field of technologies in the form of, such as a diaphragm pump as a device for pumping a fluid, a diaphragm valve as a control device for controlling flow of fluid, a diaphragm sensor as a detection device and a brake diaphragm as a braking device for transferring a braking force (cf. Patent Document 1, for example).

Patent Document 1: Japanese Patent Application Laid-open No. 2007-239769
Patent Document 2: Japanese Patent Application Laid-open No. 2006-219996
Patent Document 3: Japanese Patent Application Laid-open No. 2005-265784
Patent Document 4: Japanese Patent Application Laid-open No. H11-34870

DISCLOSURE OF THE INVENTION

Problem to be Solved by the Invention

A metal diaphragm is used in various purposes by utilization of an elastic deformation of a film part elastically deformable by a predetermined pressure. In order to realize desirable elastic deformation of this film part, it is necessary to securely and firmly fix this film part at a predetermined fixing position without deterioration of the function of the film part when this film part has been elastically deformed. Furthermore, the film part is required to demonstrate its function over a long period of time without being damaged when it is held in a fixed state.

The present invention has been conceived in consideration of the above situations. It is an object of the present invention to provide a metal diaphragm that is capable of allowing a film part to be securely and firmly fixed to a predetermined fixing position while preventing deterioration of the function of a film part, and thus realizing extension of the operational life of the film part.

Means for Solving the Problem

According to the present invention, there is provided a metal diaphragm, which includes a film part that is elastically deformable by a predetermined pressure, a thick part that is disposed at a rim portion of the film part and has a thickness greater than the film part, and a protection part that is disposed between the film part and the thick part in contact with the film part and is elastically deformable along with elastic deformation of the film part to protect the film part.

According to the above structure having the thick part formed at the rim portion of the film part, when the diaphragm is fixed to a predetermined fixing position, it is fixed through this thick part so that the film part is elastically deformable without deterioration of its function. Furthermore, when the diaphragm is fixed to have the thick part pressed, a friction force is caused by elastic deformation of the thick part in the thickness direction, and thereby the metal diaphragm can be securely and firmly fixed to a predetermined fixing position.

Furthermore, when the film part has been elastically deformed, the protection part between the film part and the thick part is elastically deformed so as to follow this film part. Whereby, it is possible to prevent damages to the film part and hence realize the extension of the operational life of the diaphragm.

In the metal diaphragm of the present invention, the protection part may have a curved surface that is curved at a predetermined curvature radius between the film part and the thick part.

According to the above structure wherein the protection part disposed between the film part and the thick part respectively having different thicknesses has this curved surface, it is possible to prevent occurrence of cracks due to stress concentration at the boundary between the film part and the thick part, and thereby extend the operational life of the diaphragm.

In the metal diaphragm of the present invention, the thick part may be formed by fixedly securing a metal plate formed separately from the film part to the rim portion of the film part by welding.

According to the above structure, a metal diaphragm can be easily manufactured.

In the metal diaphragm of the present invention, it is possible to employ the structure wherein the film part has a center portion, at which a thick part thicker than the film part is formed to reinforce a portion of the film part to which an abutting member abuts.

According to the above structure, since a part to which an abutting member abuts is formed with a thick part having a thickness greater than the film part, it is possible to increase the strength of the part to which the abutting member abuts, and hence realize a diaphragm durable for long time use.

In the metal diaphragm of the present invention, a protection part may be disposed between the thick part formed at the center portion of the film part and the film part, the protection part being elastically deformable along with elastic deformation of the film part to protect the film part.

According to the above structure, when the film part is elastically deformed, the protection part between this thick part and the film part is elastically deformed so as to follow the film part. Whereby, it is possible to prevent damages to the film part and hence realize the extension of the operational life of the diaphragm.

Advantage Of The Invention

According to the present invention, it is possible to securely and firmly fix a film part to a predetermined fixing position without deterioration of the function of the film part and thus realize the extension of the operational life of the film part.

DESCRIPTION OF THE REFERENCE NUMERALS

1: diaphragm, 1a: film part, 1b: thick part, 1c: first thick part, 1d: second thick part (protection part), 1e: curved surface, 1f: leading end portion, 1g: bent part, 1h: curved surface, 1i: inclined surface, 2: diaphragm driving chamber, 3: valve element, 4: valve seat element, 5: operating oil regulation chamber, 6: valve element supporting part, 7: urging device, 8: shaft, 9: shaft supporting part, 10: fluid pumping section, 11: thick member, 12: first thick member, 13: second thick member, 14: third thick member, 15: thick member, 16: straight part, 17: third thick part, 17a: flat surface (abutted part), 17b: flat surface, 18: fourth thick part (protection part), 18a: curved surface, 18b: curved surface, 19a: convex part, 19b: concave part, 20: gas discharge mechanism, 21: first gas discharge passage, 22: second gas discharge passage, 23a: ball member, 23b: ball member, 24: communication part, 25: flow rate adjustment part, 26: regulation part, 27: adjustment valve, 28: ball member, 29: protection cover, 31: operating oil supply part, 32: pump head, 33: inlet side check valve, 34: outlet side check valve, 35: operating oil conduit part, 37: relief mechanism, 40: driving force supply section, 41: driving force transmission shaft, 42: eccentric cam, 43: first piston member, 44: second piston member, 45: first pivoting shaft, 46: second pivoting shaft, 47: bearing, 48: bearing, 49: positional-regulating urging device, 50: casing, 60: auxiliary plunger mechanism, 70: operating oil supply valve, X1: center line of the third thick part, X2: center line of the fourth thick part

PREFERRED EMBODIMENT FOR CARRYING OUT THE INVENTION

Figure 1A:
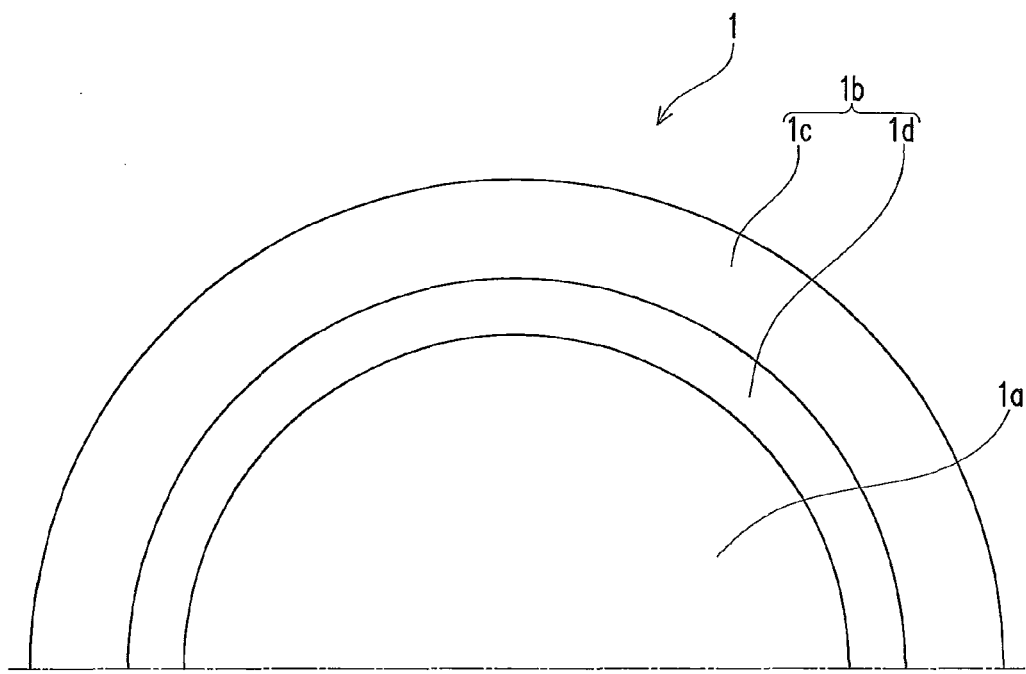
FIGS. 1 are side views showing a diaphragm of a first embodiment of the present invention.
Figure 1B:
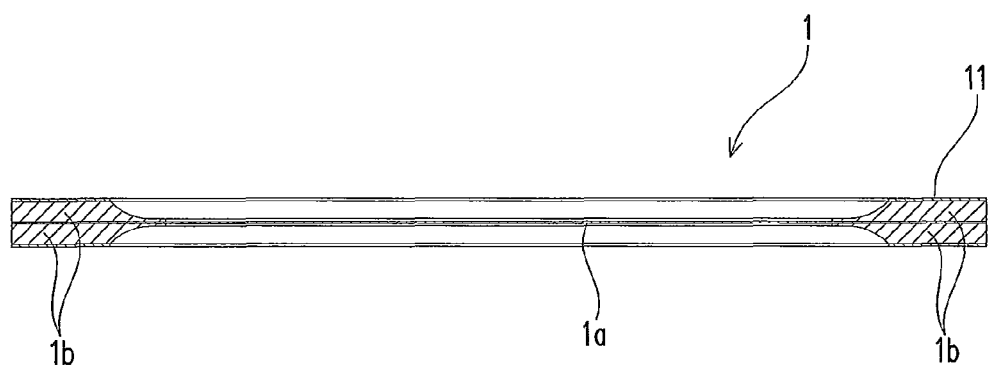
Figure 2:
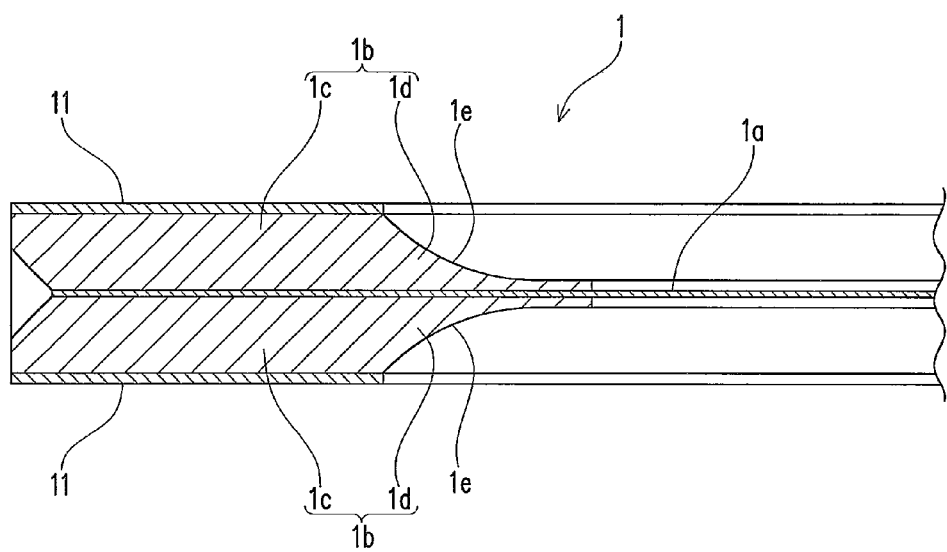
FIG. 2 is an enlarged cross sectional view of an essential part of the diaphragm.

Now, the description will be made for preferred embodiments for carrying out the invention with reference to the attached drawings. FIGS. 1 and 2 show a first embodiment of a diaphragm of the present invention.

As shown in FIGS. 1 and 2, a metal diaphragm of this embodiment (hereinafter referred simply to as a "diaphragm") 1 has a circular shape in plan view, and has a film part 1a elastically deformable by a predetermined pressure, a thick part 1b thicker than the film thickness of the film part 1a, and thick members 11 overlapped on outer surfaces of the thick part 1b in a thickness direction.

In the diaphragm 1 of this embodiment, the film part 1a has a diameter of about 100 mm and a thickness of about 0.1 mm, and a plate member having a torus shape, which forms the thick part 1b, has a thickness of about 1.5 mm.

The film part 1a and the thick part 1b are made of predetermined metal materials. In this embodiment, the film part 1a is made of a metal having a low Young's modulus and a high elastically deformability (e.g., a titanium alloy). The thick part 1b is made of, for example, pure titanium (Ti) or other metals.

The thick parts 1b each have a first thick part 1c disposed at a radially outward portion with a constant thickness, and a second thick part 1d disposed at a radially inward portion of the first thick part with a thickness gradually decreasing as it advances towards the radially inward portion.

In this embodiment, a radially outward portion of each of the first thick part 1c is fixedly secured to the film part 1a by welding (e.g., EB welding). The second thick parts 1d each are not fixedly secured to the film part 1a and, instead, are held in contact with the film part 1a.

The second thick parts 1d each have a flat surface which faces the film part 1a in the thickness direction, and a curved surface 1e having a predetermined curvature radius (e.g., a curvature radius of 4 mm) which faces oppositely to the film part 1a. Whereby, when the film part 1a has been elastically deformed by a predetermined pressure, the second thick part 1d is designed so as to be capable of being elastically deformed by the elastic deformation of this film part 1a.

The thick members 11 each are made of, for example, a synthetic resin and preferably PTFE and other fluorocarbon resins and formed into a torus-shaped thin plate with a thickness thereof being greater than the film thickness of the film part 1a. The width of each of the thick members 11 in the radial direction is substantially equal to the width of the first thick part 1c in the radial direction. The film part 1a and the thick part 1b, of each of the thick members 11 are formed separately from each other, and one side of each of the thick members 11 in the thickness direction is held in contact with (or, in overlapping relationship with) the outer side of the first thick part 1c in the thickness direction when in use.

The diaphragm 1 having the above structure can be securely and firmly fixed to a predetermined fixing position via the thick parts 1b by forming the thick parts 1b at the rim portion of the film part 1a. That is, with the diaphragm 1 fixed to have the first thick parts 1c of the thick parts 1b clamped, a friction force is generated due to deformation (elastic deformation) towards the thickness direction of the first thick parts 1c, and thereby the diaphragm 1 is unlikely to be positionally displaced, and hence can be securely and firmly fixed to a predetermined fixing position. It is possible to more securely and firmly fix the diaphragm 1 by overlapping and fixedly securing the separately formed thick member 11 onto each first thick part 1c.

The thick parts 1b each have a torus shape and formed at the rim portion of the film part 1a, and therefore the thick parts 1b are unlikely to deteriorate the function of the film part 1a, so that the film part 1a can exhibit a desirable function through a predetermined elastic deformation. Since the thick members 11 each also have a torus shape, the movement of the film part 1a is not restricted when the film part 1a has been elastically deformed, and thus the diaphragm 1 can exhibit its desirable function.

Since the second thick parts 1d of the thick parts 1b each are designed to be capable of being elastically deformed along with the elastic deformation of the film part 1a, the radially inward end of each of the first thick parts 1c is unlikely to damage the film part 1a when the film part 1a has been elastically deformed, and furthermore constantly cover and hence provide protection to the film part 1a.

That is, the second thick parts 1d each are disposed between the first thick part 1c and the film part 1a, and are designed to be elastically deformed along with the elastic deformation of the film part 1a so as to serve as a protection part for protection of the film part 1a. With this protection part (the second thick part 1d) disposed between the first thick part 1c and the film part 1a, it is not likely to cause stress concentration to the film part 1a at a boundary between the first thick part 1c and the film part 1a, thereby enabling prevention of damages to the film part 1a. Thus, the operational life of the diaphragm 1 can be extended.

With one side of the second thick part 1d formed into the curved surface 1e, even when the second thick part 1d is repeatedly elastically deformed, the second thick part 1d is unlikely to crack at a middle portion thereof. Whereby, the operational life of the diaphragm 1 can be extended, as well.

The diaphragm 1 is formed by fixedly securing the thick parts 1b to the film part 1a by welding, and thus this diaphragm 1 can be easily manufactured and thus the manufacturing costs can be minimized.

When the second thick parts d each slide relative to the film part 1a in contact with the same when the film part 1a has been elastically deformed, foreign matters adhered onto the film part 1a can be removed, which is very useful.

Figure 3:
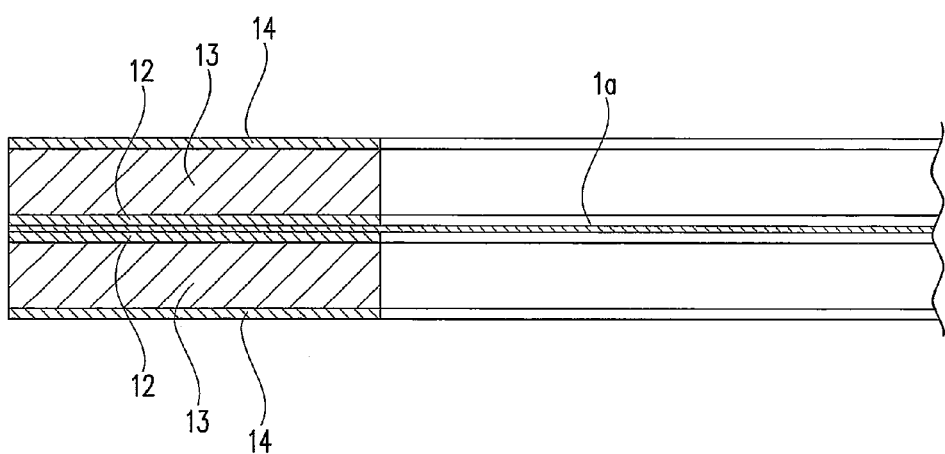
FIG. 3 is an enlarged cross sectional view of an essential portion showing a diaphragm of a second embodiment of the present invention.

FIG. 3 shows a second embodiment of the diaphragm 1. In this second embodiment, the diaphragm 1 has a film member 1a elastically deformable by a predetermined pressure, and a plurality of thick members 12, 13 and 14 provided on a rim of the film part 1a on each side thereof. In a similar manner to the first embodiment, for example, the film member 1a is made of a titanium alloy and formed into a thin film (or thin plate) having a circular shape in plan view.

In this embodiment, the plurality of thick members 12, 13 and 14 respectively have first plate members (protection members) 12, 12 (two pieces in the Figure) in contact with the film member 1a, second plate members 13, 13 (two pieces in the Figure) in contact with the first plate members 12, 12, and third plate members 14, 14 (two pieces in the Figure) in contact with the second plate members 13, 13.

The first plate members 12, 12 each have a thickness greater than the film member 1a, and the second plate members 13, 13 each have a thickness greater than the first plate members 12, 12. The third plate members 14, 14 each have a thickness substantially equal to the first plate members 12, 12.

The first plate members 12, 12 each are made of, for example, a synthetic resin, and preferably PTFE and other fluorocarbon resins and formed into a thin plate having a circular shape in plan view. The second plate members 13, 13 are made of a metal, such as titanium. The second plate members 13, 13 each are formed into a circular shape having a thickness greater than the first plate members 12, 12. The third plate members 14, 14 each are made of, for example, a synthetic resin, preferably PTFE and other fluorocarbon resins, and formed into a thin plate having a circular shape in plan view.

The respective plate members 12, 13 and 14 are disposed on a first side and a second side, of the film member 1a with the film member 1a held therebetween. More specifically, the two first plate members 12, 12 are overlapped on the film member 1a to be in contact with the rim portion of the film member 1a, and the second plate members 13, 13 are respectively overlapped on the first plate members 12, 12. The third plate members 14, 14 are respectively overlapped on the second plate members 13, 13.

Whereby, of the diaphragm 1, a portion (center portion) of the film member 1a serves as a film part that is capable of pumping a predetermined fluid through its elastic deformation, and the second plate members 13, 13 and the like serve as thick parts.

Under the above conditions, the diaphragm 1 is fixed to a predetermined fixing position. Thus, the rim of the film part 1a of the diaphragm 1 is provided with a plurality of the plate members 12, 13 and 14, which serve as thick parts, and the diaphragm 1 can be securely and firmly fixed in the same manner as the first embodiment by having the plate members 12, 13 and 14 clamped when in fixing.

The first plate member 12 disposed between the film member 1a and the second plate member 14, which serves as the thick part, is elastically deformed along with the elastic deformation of the film member (film part) 1a to thereby protect the film member 1a. That is, the first thick member 12 is elastically deformed along with the deformation of the film member 1a so as not to cause stress concentration at the boundary between the film member 1a and the second thick member 14, and therefore functions as a protection part to provide protection to the film member 1a. Whereby, the operational life of the diaphragm 1 can be extended.

FIG. 4 show a third embodiment of the diaphragm 1. The diaphragm 1 of the third embodiment is different from the diaphragm 1 of the first embodiment in the structure of the film part 1a and the second thick part (protection part) 1d of each of the thick parts 1b.

Figure 4A:
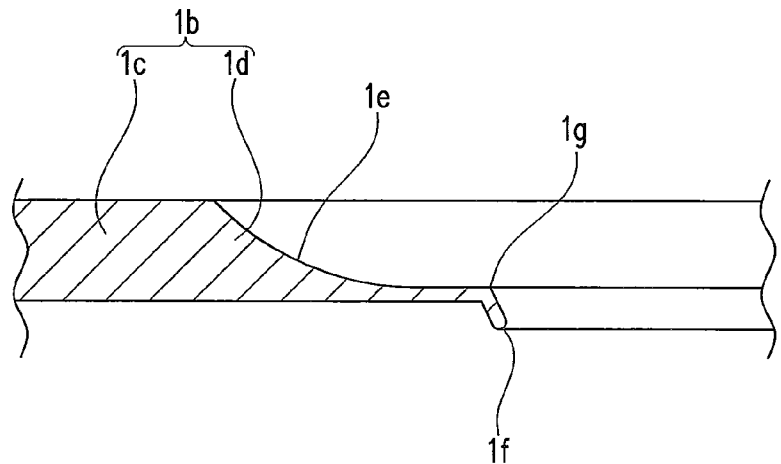
FIG. 4 are enlarged cross sectional views of an essential portion showing a diaphragm of a third embodiment of the present invention, in which FIG. 4(*a*) shows a state before a thick part is integrated with a film part, and FIG. 4(*b*) shows a state after the thick part has been integrated with the film part.
Figure 4B:
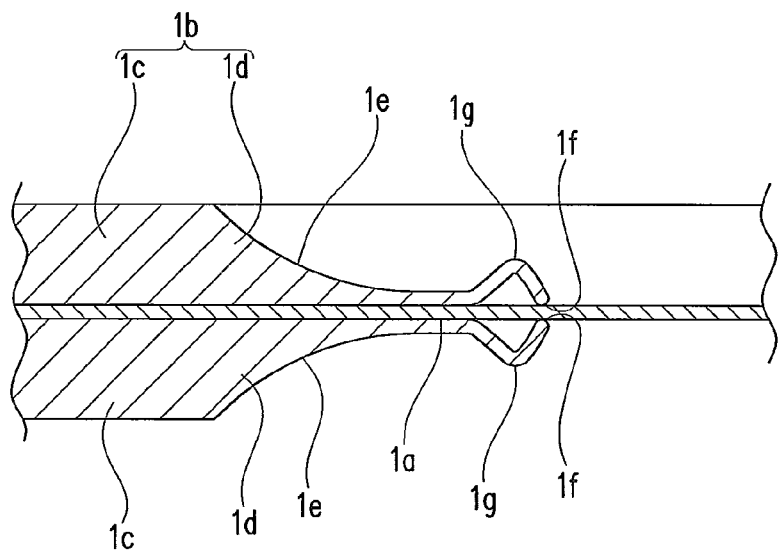

FIG. 4(a) shows the thick part 1b before it is integrated with the film part 1a. In this embodiment, the second thick part 1d is formed so as to gradually decrease in thickness as it advances towards the radially inward portion. Each of the second thick parts 1d is bent at a middle portion thereof so as to have a radially inward end 1f facing the film part 1a (hereinafter this bent part is referred to as a "bent part" 1g).

With the bent part 1g formed at the middle portion of the second thick part 1d, the leading end portion 1f of the second thick part 1d projects towards the film part 1a further than the surface of the first thick part 1c contacting the film part 1a does. With this, when the thick part 1b is fixedly secured to the film part 1a (cf. FIG. 4(b)), the leading end portion 1f of the second thick part 1d abuts against the film part 1a, and thus the bent part 1g and its approximate portion (a portion of the second thick part 1d closer to the first thick part 1b than the bent part 1g) are constantly held in elastically deformed conditions.

Since the bent part 1g and its approximate portion are constantly held in elastically deformed conditions, the leading end portion of the second thick part 1d is kept pressed onto the surface of the film part 1a. Whereby, the second thick part 1d can be instantly and elastically deformed according to the elastic deformation of the film part 1a in more tight contact with the film part 1a, when the film part 1a has been elastically deformed. Whereby, the second thick part 1d, which serves as a protection part for protection of the film part 1a, can more securely protect the film part 1a so as to prevent the film part 1a from being damaged. The leading end portion 1f can effectively remove foreign matters adhered to the film part 1a.

Figure 5:
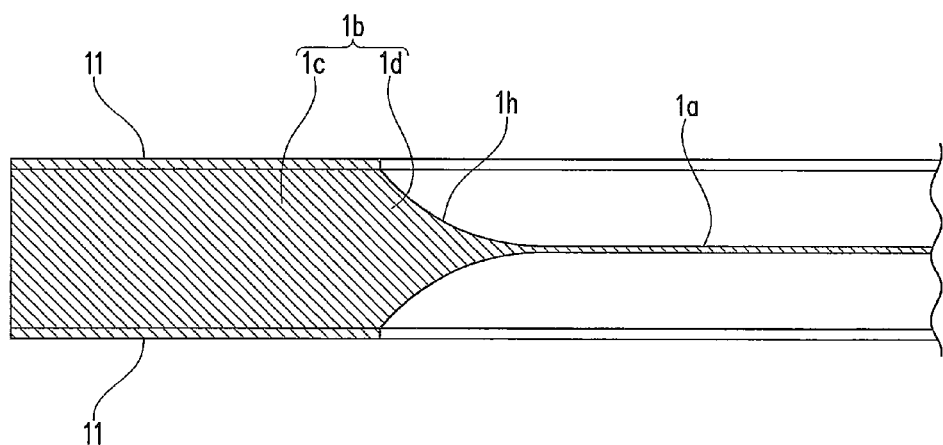
FIG. 5 is an enlarged cross sectional view of an essential portion showing a diaphragm of a fourth embodiment of the present invention.

FIG. 5 shows a fourth embodiment of the diaphragm 1. The diaphragm 1 of the first embodiment has the film part 1a formed separately from the thick parts 1b, which involves fixedly securing the thick part 1b to the film part 1a by welding. In this embodiment, the film part 1a and the thick part 1b are made of the same metal material and integrally formed together.

The thick part 1b has a first thick part 1c and a second thick part (protection part) 1d in the same manner as the first embodiment. Formed in the second thick part 1d are curved surfaces 1h connecting between the film part 1a and the first thick part 1c. In the diaphragm 1 of this embodiment, the film part 1a and the thick part 1b are formed by subjecting a circular metal plate member having a predetermined thickness to cutting, grinding or the like operation.

Thus, with the curved surfaces 1h formed between the film part 1a and the thick part 1b respectively having different thicknesses, when the film part 1a has been elastically deformed, the second thick part 1*d*, which serves as a protection part for the film part 1*a*, is unlikely to crack at its middle portion and thus can protect the film part 1*a* for a long period of time. Whereby, the operational life of the diaphragm 1 can be extended. Thick members 11 similar to those of the first embodiment are overlapped on the outer sides of the first thick part 1*c* in the thickness direction. The other advantageous effects of the first embodiment can be produced by this embodiment, as well.

Figure 6:
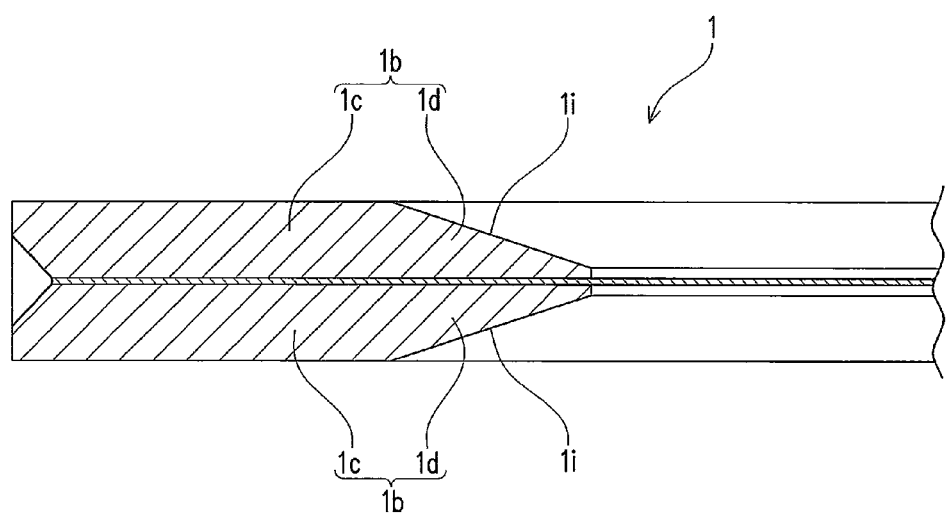
FIG. 6 is an enlarged cross sectional view of an essential portion showing a diaphragm of a fifth embodiment of the present invention.

FIG. 6 shows a fifth embodiment of the diaphragm 1. The fifth embodiment is different from the first embodiment in the shape of the second thick parts 1*d*. The curved surfaces 1*e* each having a predetermined curvature radius are formed on the second thick parts 1*d* in the first embodiment, and in place of the curved surfaces 1*e*, inclined surfaces 1*i* that are inclined at a predetermined angle are formed in the second embodiment. The inclined surfaces 1*i* are inclined so as to gradually come close to the film part 1*a* as they advance from the first thick parts 1*c* to the radially inward portion of the film part 1*a*.

With the inclined surfaces 1*i* formed on the second thick parts 1*d*, the second thick parts 1*d* each gradually decrease in thickness as they advance towards the radially inward portion of the diaphragm 1. Whereby, in this embodiment, the second thick parts 1*d* function as protection parts for protection of the film part 1*a* by being elastically deformed along with the elastic deformation of the film part 1*a* in the same manner as the first embodiment. The remaining structures of this embodiment are the same as those of the first embodiment, and this embodiment can produce similar advantageous effects to those of the first embodiment.

The diaphragm 1 of the above structure can be used in various fields of use, such as a fluid pumping device for pumping a fluid, a detection device such as a diaphragm sensor, a fluid control device such as a diaphragm valve, and a braking device such as a brake diaphragm.

Now, the description will be made for a reciprocating pump using the diaphragm 1 as a fluid pumping device, which is one example of the usages of the diaphragm 1.

Figure 7:
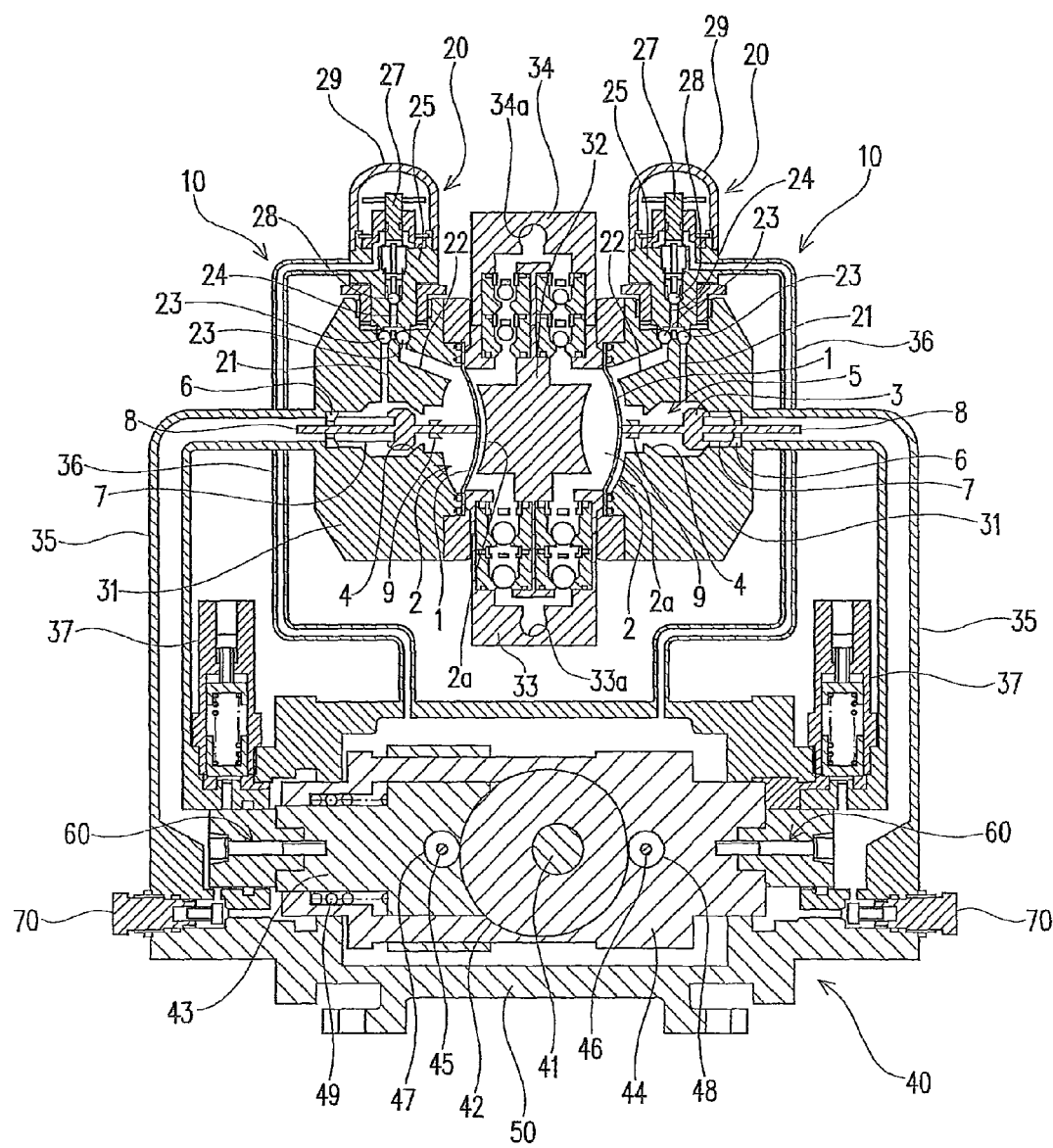
FIG. 7 is a schematic cross sectional view of a reciprocating pump using a diaphragm of the present invention.

As shown in FIG. 7, a reciprocating pump is designed to perform predetermined reciprocating actions to pump a fluid by cyclically and elastically deforming two diaphragms 1, 1. This reciprocating pump includes fluid pumping sections 10, 10 respectively mounting therein the diaphragms 1, 1 and disposed on right and left hand sides, a driving force supply section 40 for supplying an operating oil at an appropriate timing to drive the diaphragms 1, 1, and a driving section (not shown) having an electric motor for generating rotational motion and gears and the like for transferring a rotational force of the electric motor to the driving force supply section 40.

The fluid pumping sections 10, 10 respectively include operating oil supply parts 31, 31 disposed on right and left hand sides for supplying an operating oil from the driving force supply section 40 to the diaphragms 1, 1, a pump head 32 disposed between these operating oil supply parts 31, 31, and a gas discharge mechanism 20 for discharging a gas entrained in the operating oil within the operating oil supply parts 31, 31 to the outside.

The fluid pumping sections 10, 10 are constituted by claming the diaphragms 1, 1 by use of the pump head 32 and the right and left operating oil supply parts 31, 31. In this case, the diaphragms 1, 1 are securely and firmly fixed between the pump head 32 and the right and left operating oil supply parts 31, 31 by having the thick part 1*b* or portions of the thick members 11 to 15 clamped by the pump head 32 and the right and left operating oil supply parts 31, 31.

Each diaphragm driving chamber 2 with the diaphragm 1 mounted therein is constituted by use of the operating oil supply part 31 and the pump head 32. Operating oil regulation chambers 5, which respectively include valve elements 3, 3 connected to the diaphragms 1, 1 and valve seat elements 4, 4 corresponding thereto, are provided respectively in the operating oil supply parts 31, 31.

The pump head 32 is further provided with an inlet side check valve 33 that functions to inflow a pumped fluid, and an outlet side check valve 34 that functions to outflow a pumped fluid, so that a pumped fluid flows into a fluid pumping chamber 2*a* of each diaphragm driving chamber 2 via its inflow passage 33*a* and the inlet side check valve 33, and flows out into a predetermined transfer passage via the outlet side check valve 34 and its outflow passage 34*a*.

In the diaphragm driving chambers 2, 2, the driving force from the driving section is received by the diaphragms 1, 1 via the driving force supply section 40 so that the diaphragms 1, 1 are reciprocated by this driving force. Specifically, the driving force supply section 40 and the operating oil supply parts 31, 31 are communicated with each other via the conduit parts 35, 35, the insides of the conduit parts 35, 35 and the operating oil supply parts 31, 31 are filled with an operating oil, and the reciprocating actions of hereinafter referred piston members 43, 44 of the driving force supply section 40 are transmitted to the diaphragms 1, 1 via an operating oil within the operating oil conduit parts 35, 35 and the operating oil supply parts 31, 31.

The valve elements 3, 3 within the operating oil regulation chambers 5, 5 are attached to valve element supporting parts 6, 6 via urging devices 7, 7, such as coil springs, and are fixedly secured to shafts 8, 8 extending between the operating oil regulation chambers 5, 5 and the diaphragm driving chambers 2, 2.

The shafts 8, 8 respectively have one ends which are fixed on the surfaces of the diaphragms 1, 1 close to the operating oil regulation chambers 5, 5, and are urged towards the diaphragms 1, 1 via the urging devices 7, 7 and the valve elements 3, 3.

Shaft supporting parts 9, 9 for supporting the shafts 8, 8 are provided between the operating oil regulation chambers 5, 5 and the diaphragm driving chambers 2, 2, and the shaft supporting parts 9, 9 have through-holes for communicating an operating oil from the operating oil regulation chambers 5, 5 to the diaphragm driving chambers 2, 2. Similarly, the valve element supporting parts 6, 6 have through-holes for communication of an operating oil.

By the operating oil regulation chambers 5, 5 having the aforesaid structure, when the diaphragms 1, 1 are elastically deformed and predetermined reciprocating actions are achieved by an operating oil flown into the operating oil supply parts 31, 31 via the operating oil conduit parts 35, 35, the valve elements 3, 3 are also reciprocated along with the diaphragms 1, 1. When excessive pressure has been applied to the operating oil regulation chambers 5, 5, the valve elements 3, 3 are shifted to abut against the valve seat elements 4, 4.

Whereby, the operating oil regulation chambers 5, 5 prevent the diaphragms 1, 1 from being subjected to excessive pressure and hence being damaged. Provided between the operating oil regulation chambers 5, 5 and the driving force supply section 40 are relief mechanisms 37, 37, which are capable of maintaining the pressure at an appropriate level by discharging a predetermined amount of an operating oil by these relief mechanisms 37, 37, when excessive pressure has been applied to the operating oil regulation chambers 5, 5.

With this reciprocating pump having the diaphragm driving chambers 2, 2 and the operating oil regulation chambers 5, 5, a gas such as air, which has been entrained in an operating oil, is likely to stay at the uppermost part of each of the chambers 2, 5. Therefore, the reciprocating pump is provided with the gas discharge mechanisms 20, 20 in order to appropriately discharge the gas within the diaphragm driving chambers 2, 2 and the operating oil regulation chambers 5, 5. Each gas discharge mechanism 20 includes a first gas discharge passage 21 provided to the operating oil regulation chamber 5, a second gas discharge passage 22 provided to the diaphragm driving chamber 2, and a flow rate adjustment part 25 for adjusting the flow rates of a gas discharged through the gas discharge passages 21, 22 and an operating oil.

Each first gas discharge passage 21 has one end disposed on an upper side within the operating oil regulation chamber 5 at a position closer to the operating oil conduit part 35 than the valve seat element 4 does, and each second gas discharge passage 22 has one end disposed on an upper side within the diaphragm driving chamber 2 at a position between the diaphragm 1 and the valve seat element 4.

The opposite ends of the discharge passages 21, 22 are disposed close to each other so as to communicate with a communication part 24 formed between the flow rate adjustment part 25 and the operating oil supply part 31. Furthermore, ball members 23a, 23b (backflow prevention members) are provided respectively on the first gas discharge passage 21 and the second gas discharge passage 22 to prevent backflow.

Each flow rate adjustment part 25 includes a ball member 28 for backflow prevention and an adjustment valve 27 for adjusting the lifting amount (motion space) of this ball member 28. The adjustment valve 27 has therein an in-valve discharge passage. The adjustment valve 27 has an outer circumferential part, on which an outwardly threaded portion is formed to be held in threaded engagement with the flow rate adjustment part 25, so that the lifting amount of the ball member 28 is adjusted by the screwing amount of the adjustment valve 27. The flow rates of a gas and an operating oil communicating through the flow rate adjustment part 25 can be adjusted by adjusting the lifting amount of the ball member 28 by the adjustment valve 27.

The flow rate adjustment parts 25, 25 are connected to an operating oil reservoir part (within the casing 50) of the driving force supply section 40 via a fluid discharge conduit part 36. Above the adjustment valve 27 of each flow rate adjustment part 25 is disposed a protection cover 29 that covers this adjustment valve 27 in a detachable manner (or an openable manner) for adjustment of the adjustment valve 27.

According to each gas discharge mechanism 20 having the aforesaid structure, the adjustment valve 27 is operated to bring the ball member 28 into a state where it can be moved through a predetermined lifting amount, thereby enabling a gas, which has been entered in the diaphragm driving chamber 2 and the operating oil regulation chamber 5, to push up the ball members 23a, 23b, 28 through the first gas discharge passage 21 and the second gas discharge passage 22, and thus the gas is discharged to the outside through the in-valve discharge passage of the adjustment valve 27. An operating oil which has been flown out with the gas discharged is recovered to the driving force supply section 40 through the fluid discharge conduit part 36.

The driving force supply section 40 includes a driving force transmission shaft 41 for receiving the driving force through a gear of the driving section, an eccentric cam 42 mounted to the driving force transmission shaft 41, a piston section (the first piston member 43 and the second piston member 44) reciprocating according to the motion of the eccentric cam 42, a first pivoting shaft 45 supported by an inner ring of a bearing 47 within the first piston member 43, a second pivoting shaft 46 supported by an inner ring of a bearing 48 within the second piston member 44, a positional-regulating urging device 49, which serves as an adjusting device functioning to bring the pivoting shafts 45, 46 respectively provided in the piston members 43, 44 into contact with the eccentric cam 42 by appropriately urging the first piston member 43 and the second piston member 44 within the second piston member 44, the casing 50 for housing these elements, and the like. A sealed space between the inner wall of the casing 50 and the piston members 43, 44 of the driving force supply section 40 having the aforesaid elements is filled with an operating oil.

The second piston member 44 of the driving force supply section 40 is formed into a hollow shape. In other words, the second piston member 44 is formed to be capable of housing therein the driving force transmission shaft 41, the eccentric cam 42, the first piston member 43, the bearing 48, the positional-regulating urging device 49 and the like.

The positional-regulating urging device 49 is held between the inner wall (inner side) of the second piston member 44 and the outer wall (outer side) of the first piston member 43. That is, the first piston member 43 and the second piston member 44 are urged towards the position, at which the eccentric cam 42 is located, by the positional-regulating urging means 49. In other words, the first pivoting shaft 45 within the first piston member 43 and the second pivoting shaft 46 within the second piston member 44 are appropriately urged to be constantly held in contact with the outer circumference of the eccentric cam 42 by the positional-regulating urging means 49.

Corresponding to the first piston member 43 and the second piston member 44, the driving force supply section 40 includes auxiliary plunger mechanisms 60, 60 and operating oil supply valves 70, 70, which are designed to prevent lowering of the driving force due to the recovering of an operating oil to the driving force supply section 40 through the gas discharge mechanisms 20, 20 and the fluid discharge conduit parts 36, 36.

The reciprocating pump of this embodiment functions in the following manner when in a normal operation. In this reciprocating pump, the electric motor is rotated and this rotational force is transmitted to the driving force transmission shaft 41 with gears.

Then, the eccentric cam 42 is rotated by the driving force transmission shaft 41, and the first piston member 43 and the second piston member 44 are reciprocated by the rotation of the eccentric cam 42. Herein, with the aforesaid structure, the first piston member 43 and the second piston member 44 are integrally reciprocated by the single eccentric cam 42. These reciprocating actions of the piston members 43, 44 cause a pressure of a predetermined magnitude and a predetermined direction to affect on an operating oil, and this operating oil is fed and discharged into the conduit parts 35, 35.

Then, with the operating oil communicating through the conduit parts 35, 35, the diaphragms 1, 1 each are reciprocated at an appropriate timing, and the motions of the diaphragms 1, 1 cause the inlet side check valve 33 and the outlet side check valve 34 to be operated, so that a desirable liquid is pumped.

In a normal operation of the reciprocating pump of this embodiment, the respective structural elements are functioned in the manner mentioned above to cause the diaphragms 1, 1 to be repeatedly reciprocated. Thus, a desirable fluid can be quantitatively pumped. The reciprocating pump may be designed to have the reciprocating actions of the two diaphragms 1, 1 differentiated from each other, thereby enabling pumping the fluid in pulseless manner.

Figure 8:
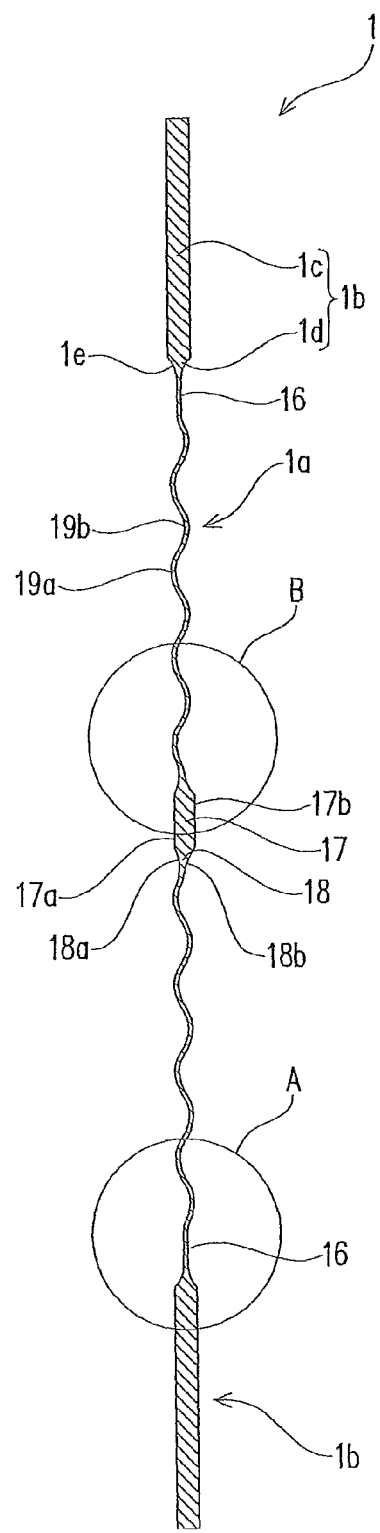
FIG. 8 is a cross sectional view showing a diaphragm of a sixth embodiment of the present invention.
Figure 9:
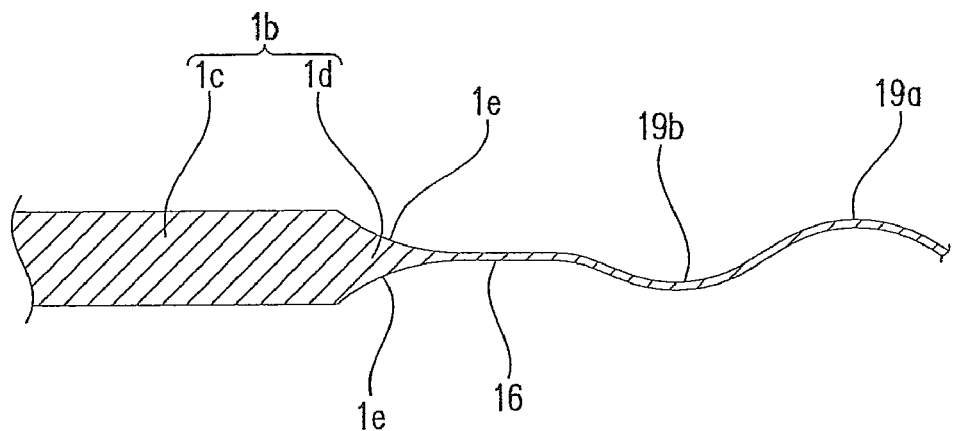
FIG. 9 is an enlarged cross sectional view of an A-area of FIG. 8.
Figure 10:
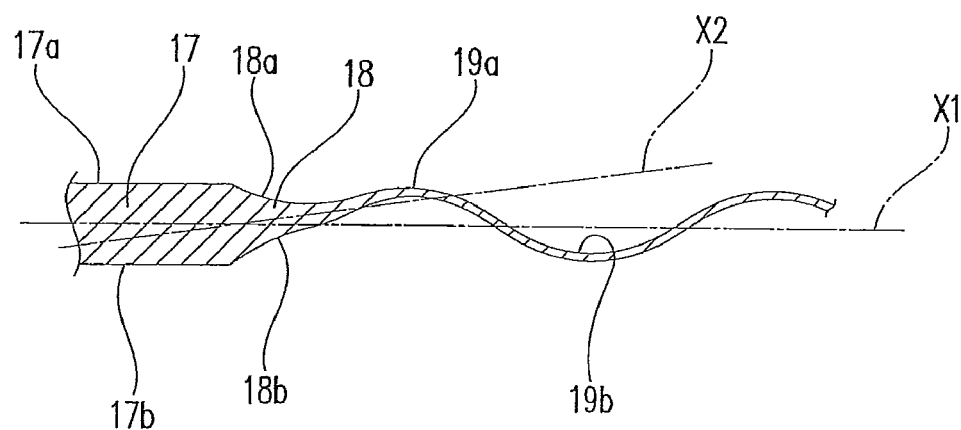
FIG. 10 is an enlarged cross sectional view of a B-area of FIG. 8.

FIGS. 8-10 show a diaphragm of a sixth embodiment according to the present invention. The diaphragm 1 has a circular shape, and has a thick part 1b (a first thick part 1c, and a second thick part 1d as a protection part), and a film part 1a. Of this diaphragm 1, the thick part 1b and the film part 1a are made of the same metal material (e.g., a titanium alloy) as that of the fourth embodiment and formed integrally with each other. This diaphragm 1 is formed by subjecting a plate material to cutting and grinding.

The diaphragm 1 of this embodiment is different in the structure of the film part 1a from the diaphragm 1 of the fourth embodiment. That is, the film part 1a has a corrugated shape at a middle portion in a cross sectional view. A radially outermost portion of the film part 1a of the diaphragm 1 has not a corrugated shape, but a straight part (hereinafter referred to as a "straight part") 16. This straight part 16 has a radially outer end portion connected to the second thick part 1d.

The film part 1a has a center portion which includes a thick part (hereinafter referred to as a "third thick part") 17 having a constant thickness, and a thick part (hereinafter referred to as a "fourth thick part") 18 surrounding the periphery of the third thick part 17 along the circumferential direction. The thickness of each of the third thick part 17 and the fourth thick part 18 is greater than the thickness of the film part 1a.

The film part 1a has a corrugated shape having convex parts 19a and concave parts 19b alternately formed at a predetermined pitch, as shown in FIGS. 8 and 9.

The third thick part 17 has a circular plate shape having a constant thickness. The third thick part 17 has two flat surfaces 17a, 17b parallel to each other in the radial direction of the diaphragm 1. Of these two flat surfaces 17a, 17b, the one flat surface 17a is abutted with an abutting member, such as the shaft 8 of the aforesaid pump. That is, the one flat surface 17a of the third thick part 17 serves as an abutted part to which an abutting member abuts. As a reciprocating pump to which the diaphragm 1 is applied, there are reciprocating pumps having the film part 1a mechanically deformed by a piston, a plunger or the like, as well as a reciprocating pump having the film part 1a elastically deformed by hydraulic pressure as mentioned above. For these reciprocating pumps, the abutted part is abutted and thus pressed with an abutting member, such as a piston and a plunger.

A fourth thick part 18 is formed to gradually decrease in thickness as it advances towards the radially outward portion of the diaphragm 1. More specifically, the fourth thick part 18 has curved surfaces 18a, 18b each curved at a predetermined curvature radius so as to decrease in thickness as it advances towards the radially outward portion of the diaphragm 1. They are formed on both the opposite sides of the fourth thick part 18 in the thickness direction.

As shown in FIG. 10, the fourth thick part 18 is formed close to one side of the third thick part 17 in the thickness direction, with respect to the center line passing through the center in the thickness direction of the third thick part 17. Specifically, this fourth thick part 18 is formed to come closer to the abutted part (17a) of the third thick part 17 than the center line as it advances towards the radially outward portion of the diaphragm 1. More specifically, a center line X2 of the fourth thick part 18 in the thickness direction crosses the center line of the third thick part 17 at a predetermined angle. The center line X2 of the fourth thick part 18 diagonally crosses a center line X1 of the third thick part 17 so as to move away from the third thick part 17 as it advances towards the radially outward portion of the diaphragm 1 (the direction in which it advances from the third thick part 17 towards the first thick part 1c).

In this embodiment, for example, the diameter of the diaphragm 1 is about 120 mm, the thickness of the film part 1a is 0.20 mm, the thickness of the first thick part 1c is 2 mm, the diameter of the third thick part 17 is about 4.5 mm, the thickness of the third thick part 17 is about 1.7 mm, and the curvature radii of the curved surface 1e of the second thick part 1d and the curved surfaces 18a, 18b of the fourth thick part 18 are 4 mm, respectively.

According to the sixth embodiment, the second thick part 1d, which serves as the protection part, is provided between the first thick part 1c and the film part 1a, and is unlikely to cause stress concentration to the film part 1a at a boundary between the first thick part 1c and the film part 1a by the elastic deformation of the second thick part second thick part 1d along with the elastic deformation of the film part 1a, and thereby it is possible to prevent damages to the film part 1a. Whereby, the operational life of the diaphragm 1 can be extended.

Furthermore, since the third thick part 17, to which the abutting member abuts, is formed thicker than the film part 1a, the third thick part 17 is increased in strength and thus the diaphragm 1, which is durable for long time use, can be achieved.

When the film part 1a is elastically deformed, the fourth thick part 18 between the film part 1a and the third thick part 17 is elastically deformed so as to follow the deformation of the film part 1a so as to serve as a protection part for prevention of damages to the film part 1a. Whereby, the extension of the operational life of the diaphragm 1 can be realized. Moreover, with the surfaces 18a, 18b of the fourth thick part 18, which are formed into curved shape, the fourth thick part 18 is unlikely to cause cracks or the like, and thereby the further extension of the operational life of the diaphragm 1 can be realized.

The fourth thick part 18 is formed close to the abutted part of the third thick part 17 and therefore a portion near this abutted part can be reinforced. That is, when an excessive negative pressure takes place in the operating oil regulation chamber 5 of the aforesaid pump, a pressure acts on the side of the diaphragm 1 close to the operating oil regulation chamber 5 (the side on which the abutted part 17a is formed). Whereby, the film part 1a of the diaphragm 1 is greatly elastically deformed by this pressure. At this moment, the portion of the third thick part 17 close to the abutted part, which is reinforced by the fourth thick part 18, can absorb the excessive negative pressure by the elastic deformation of the fourth thick part 18. Whereby, the film part 1a is hard to be damaged and thus further extension of the operational life of the diaphragm 1 can be realized.

The present invention is not necessarily limited to the above embodiments, and can be subjected to various modifications or variations.

For example, in the above embodiments, the diaphragm 1 has a circular shape in plan view, as an example, but the diaphragm 1 is not necessarily limited to this shape, and may be formed with a square shape or other polygonal shapes, an elliptical shape or any other different shapes in plan view.

In the first embodiment, the thick part 1b is formed by holding the film part 1a by the two toric shaped plate members and fixedly securing them together. However, the thick part 1b may be formed by fixedly securing a single toric shaped plate member to one side of the film part 1a.

In the first embodiment, cited as an example is the diaphragm 1, which has a diameter: 100 mm, the film thickness of the film part 1a: 0.1 mm, and the thickness of each thick part 1b: 1.5 mm. This is not necessary and it is possible to use the diaphragm 1 having a different dimension or size, or thickness according to the intended use. The diaphragm of the present invention is not necessarily limited to the dimension or size exemplified in the sixth embodiment.

In the above embodiments, cited as an example is the diaphragm 1 which has the film part 1a formed into a circular plate shape in plan view, but this is not necessary and the film part 1a to be used may be formed into, for example, a corrugated shape in cross sectional view. With this, the film part 1a can be more greatly elastically deformed.

In the above embodiments, cited as an example is the diaphragm 1 which has the film part 1a made of a titanium alloy, but this is not necessary and the diaphragm 1 may be made of various different metals.

In the above first embodiment, cited as an example is the diaphragm 1 wherein the thick member 11 is further placed on the thick part 1b. Alternatively, the thick part 1b may be directly fixed to a predetermined fixing position without the thick member 11.

For each of the thick member 11 of the first embodiment, the first thick member 12, the second thick member 13 and the third thick member 14, of the second embodiment, and the thick member 15 of the third embodiment, two pieces are provided to the film part 1a or the film member 1a, but this is not necessary and three or more for each of the thick members 11-15 may be prepared.

The above embodiments were described by taking, for example, the arrangement where the thick part 1b is formed at the rim portion of the single film part (film member) 1a, but this is not necessary. For example, two or more of film parts (film members) 1a, 1a may be overlapped and fixedly secured integrally together by welding or the like the rim portion to form the thick part 1b at the rim portion. Whereby, even when a portion of the plural film parts 1a has been broken, a remaining film part 1a can function to pump a fluid, enabling extension of the operational life of the diaphragm 1.

Industrial Applicability

The diaphragm can be applied to the intended use, in which it can be securely and firmly fixed to a predetermined fixing position without deterioration of the function of a film part, and realize the extension of the operational life of the film part.

The invention claimed is:

1. A metal diaphragm comprising
a film part that is elastically deformable by a predetermined pressure, and
a thick part having a torus shape, that is disposed at a rim portion of the film part and has a thickness greater than the film part,
wherein the thick part has a first thick part which is fixedly secured to the film part, and a second thick part which is formed so as to gradually decrease in thickness as it advances towards a radially inward portion of the first thick part,
the second thick part has a bent portion at a middle portion thereof, and
the bent portion of the second thick part is held in elastically deformed conditions so as to have a radially inward end of the second thick part keeping pressed onto the film part.

2. The metal diaphragm according to claim 1, wherein the second thick part has a curved surface that is curved at a predetermined curvature radius between the film part and the first thick part.

3. The metal diaphragm according to anyone of claims 1 and 2, wherein the thick part is formed by fixedly securing a metal plate formed separately from the film part to the rim portion of the film part by welding.

4. The metal diaphragm according to anyone of claims 1 and 2, wherein the film part has a center portion, at which a thick part thicker than the film part is formed to reinforce a portion of the film part to which an abutting member abuts.

5. The metal diaphragm according to claim 4, wherein a protection part is disposed between the thick part formed at the center portion of the film part and the film part, the protection part being elastically deformable along with elastic deformation of the film part to protect the film part.

* * * * *